Dec. 31, 1935.  E. F. GREEN ET AL  2,026,507
CURB JACK
Filed Jan. 6, 1932   2 Sheets-Sheet 1
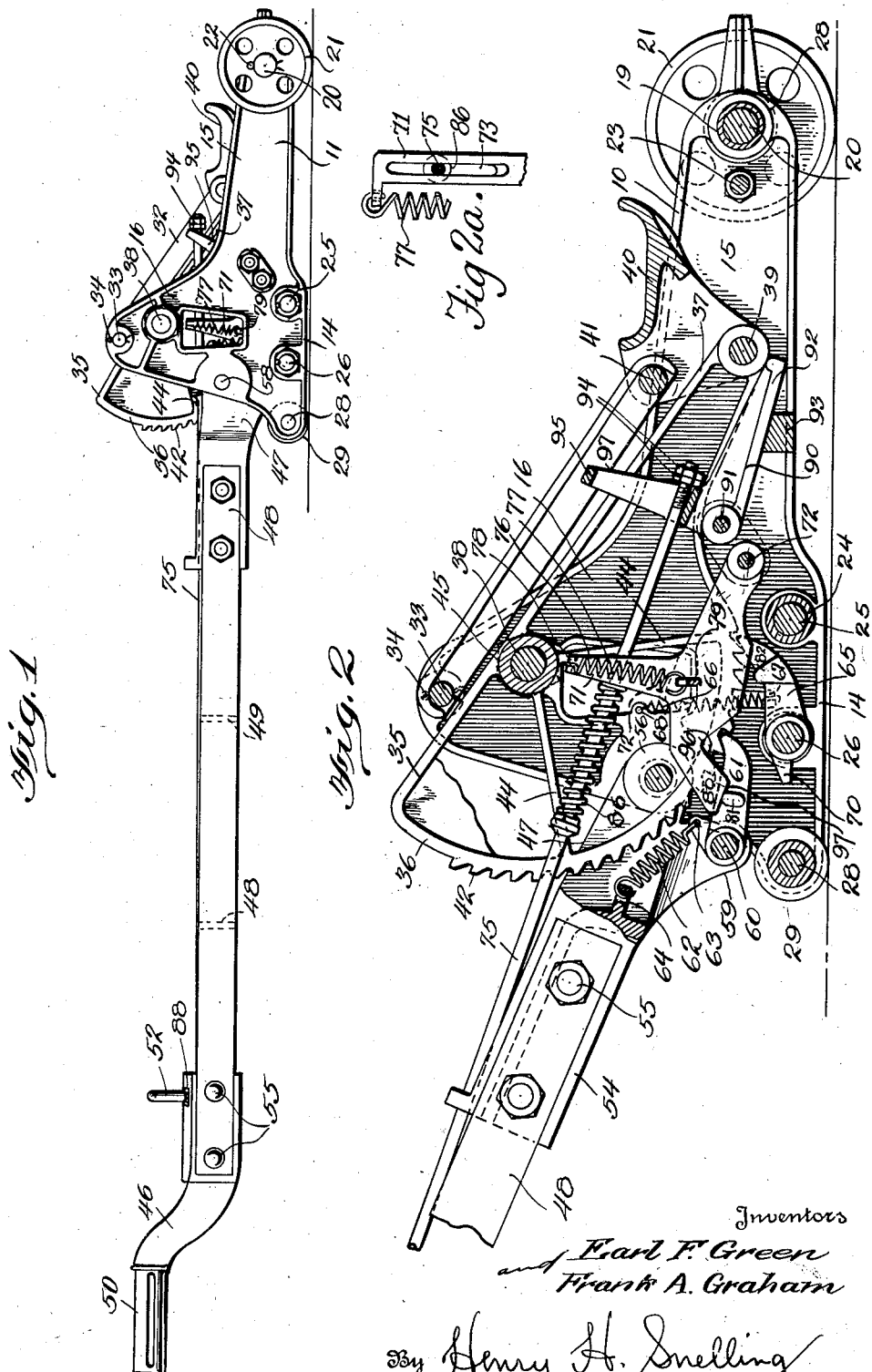
Inventors
Earl F. Green
Frank A. Graham
By Henry H. Snelling
Attorney

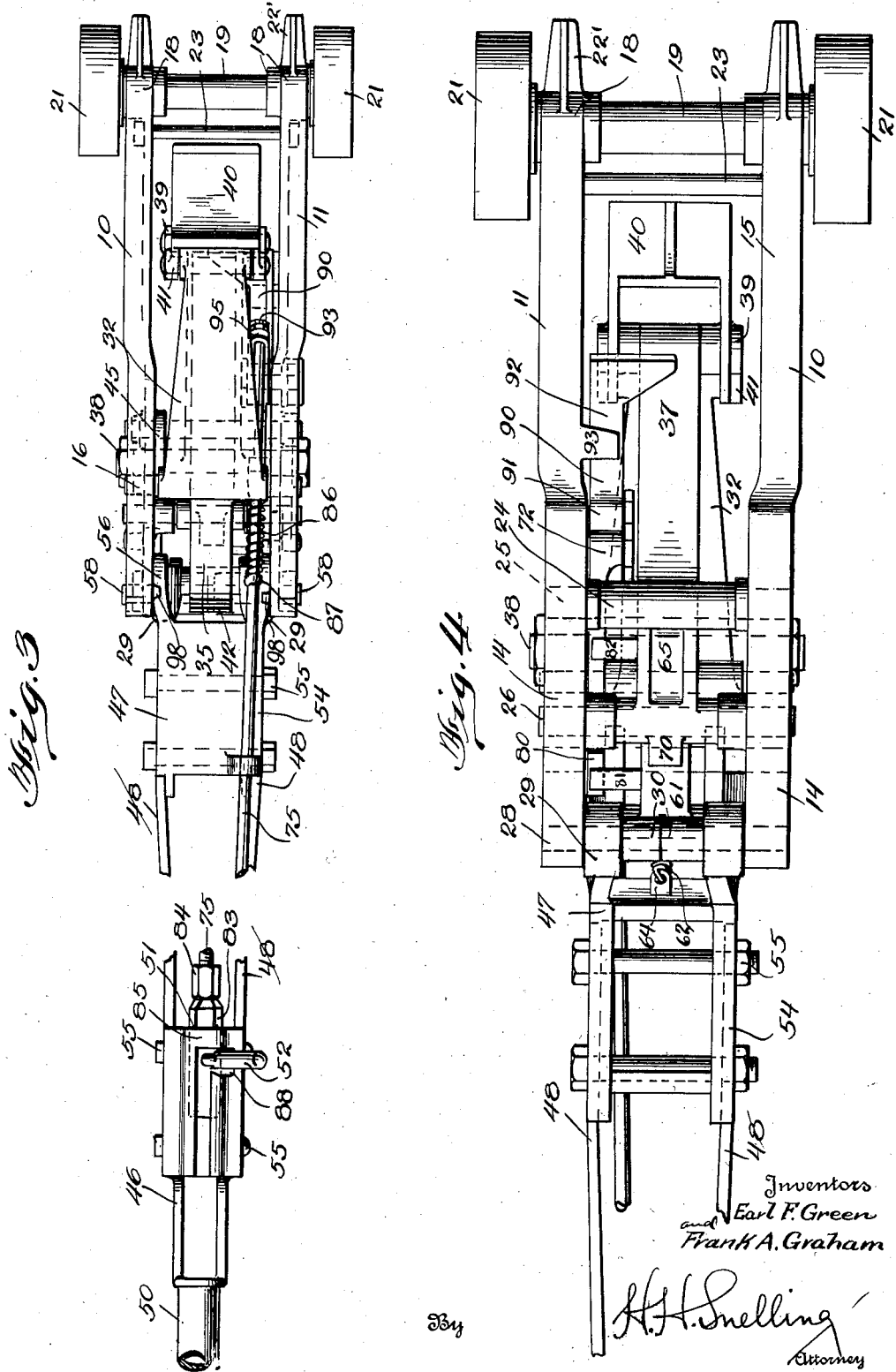

UNITED STATES PATENT OFFICE 2,026,507

CURB JACK

Earl F. Green and Frank A. Graham, York, Pa., assignors, by mesne assignments, to American Chain Company, Inc., New York, N. Y., a corporation of New York Application January 6, 1932, Serial No. 585,084

12 Claims. (Cl. 254—2)

This invention relates to lifting jacks particularly of the type adapted for the raising of an automobile off of one of its wheels for the performance of some simple operation which requires only a short time, for example, the changing of a tire which can be accomplished while the automobile is standing at the curb.

The principal object of the present invention is the provision of a jack, the body of which is of minimum length, the overall height of the lowered saddle of which is very small and in which the operation is quick and speedy while having a high factor of safety.

An important object of the present invention lies in the provision of a specific and highly efficient system of levers and pawls whereby an easily accomplished movement of an operating rod will shift the pawl mechanism so as to raise the load support or lower it, each in a step by step movement.

A still further object of the present invention lies in the provision of a device for raising the load support quicker than can be accomplished by the regular step by step motion.

Other objects of the invention lie in the provision of a short body which at its forward end will substantially rest upon the ground or other supporting surface and which at its rear end will strike an obstruction such as a wall thus preventing damage to the ground wheels located at the extreme rear of the jack and will support the jack when stored against a vertical wall; the provision of means for locating the load support so that this member can clear an obstruction under which the ground wheels may run. In other words the minimum height of the load support is little, if any, greater than the overall height of the ground wheels.

In the drawings:

Figure 1 is a general side elevation.

Figure 2 is a longitudinal section showing the lifting lever and asosciated parts in side elevation.

Figure 2a is a view of one of the parts.

Figure 3 is a top plan view.

Figure 4 is a bottom view.

The body of the jack consists of two similar side members, which may be plates, or, as illustrated, are castings 10 and 11, each having a lower front portion 14 which clears the ground by a very slight amount, a rearwardly extending beam section 15 and substantially triangular lever supporting section 16. Near the rear end of the body plates 10 inwardly and outwardly extending hubs 18 are formed which receive snugly a pipe 19 thru which extends somewhat loosely the rear axle 20 on which the two ground wheels 21 turn freely and retained by cotters 22. It will be noted that the rear projection 22' of the frame or body is beyond the margin of the ground wheels 21 so that when the jack is accidentally pushed against such an object as a wall, the jar will be taken by the body of the jack and not by the wheels. When the jack is not in use it is stood upon these two frame ends 22' with the handle and body vertical so that an extremely small space is required and there is no tendency to slip as would be if the jack were resting on the wheels 21. A bolt 23 fastens securely the rear ends of the frame or body pieces 10 and 11 and aids in making a solid fit between the pipe 19 and the bosses 18. We prefer not to thread the pipe into the side plates altho we desire that the joint between the pipe and the two body pieces shall be a snug and firm connection.

A somewhat similar pipe spacer 24 connects the two side pieces 10 and 11 together in firm manner, a bolt 25 passing thru the pipe 24 and making a rigid connection at the rear of the bottom edge 14 thus permitting looseness in the adjacent pivot 26 on which the holding pawl is mounted and in the forward shaft or axle 28 on which is loosely mounted a pair of small ground wheels or rollers 29 each having an extended spacing sleeve 30. We find that a structure such as just described is more satisfactory and sturdy than one having a single spacer of hollow tubular form between the two wheels 29. A third rigid connection between the two side plates is furnished by the main shaft 38.

The usual construction of the lifting lever is reversed in this jack since the drag link 32 is pivoted to the apex of the frame on a shaft 33 which preferably is itself loose and held in place by cotters 34. The lifting lever 35 consists of a quadrant 36 and a rearwardly extending integral arm 37, the former being pivoted on a stationary, shouldered main shaft 38 and the latter carrying a pivot shaft 39 for the saddle 40 which likewise is pivoted as at 41 to the drag link 32 in order that the saddle may at all times be horizontal, that is, parallel to a plane passing thru the floor engaging points of the four supporting wheels. The lifting lever 35 is preferably in the form of a casting reinforced by a flange extending entirely around its periphery and in which are the teeth 42 thruout the quadrant section. A number of radial strengthening ribs 44 extend from the rather large hubs 45 of the lifting lever to the toothed sector. The axes 33, 38, 39 and 41 form a parallelogram in customary manner. While the drag link 32 is preferably formed of a casting channel-shaped in cross section, this member can obviously be a pair of parallel links, the channel-shaped form however giving much greater strength and being preferred.

The handle of the jack consists of a hand piece casting 46, a lever casting 47 and connecting means 48, the latter preferably consisting of a pair of flats joined by transverse pieces 48' and 49 preferably, tho not necessarily, welded to the two flats. At the end of the hand piece casting 46 is the handle or grip 50. We prefer that the hand piece casting, while forked for a large portion of its extent, shall be closed at its rear as at 51 just to the rear of the bayonet slot 88 in which moves the knob 52 which controls the shifting of the pawl mechanism from raising to lowering and vice versa.

The lever portion of the handle includes a hollow box-like structure 54 thru which pass the bolts 55 holding the flats and rearwardly has pivot lugs 56 carrying separate axle studs 58 as a single shaft at this point would interfere with the lifting lever. Downwardly and rearwardly extending lugs 59 receive a pivot shaft 60 on which is pivoted the lifting pawl 61 which is normally held in engagement with the teeth of the lifting lever by means of a spring 62 having its rear end in a small projection 63 on the top of a lifting pawl and having its forward end in a lug 64 projecting centrally from the rear face of the box-like portion 54.

As the handle is raised it turns about the pivot 58 and the pawl 61 will idle over a single tooth but will engage the next successive tooth because of the urge of the spring 62. On downward movement of the handle the axis 60 of the lifting pawl will move downwardly and rearwardly and since the pawl is in engagement with a tooth of the lifting lever the rearwardly extending arm 37 of the latter will be raised by such downward movement of the handle when the parts are in position to elevate the load.

Somewhat below and to the rear of the axis 60 of the lifting pawl is the axis of the holding pawl 65, this being the shaft 26 which is mounted in bosses extending in both directions from the side plates or frame pieces 10 and 11. The holding pawl engages the third tooth to the rear of the tooth held by the raising pawl, the length of the holding pawl from its axis to its engaging edge being somewhat greater than the similar length of the lifting pawl. The holding pawl 65 is normally held in engagement with the teeth of the quadrant of the lifting lever by means of a nearly vertical spring 66 passing thru a lug 67 on the holding pawl and being held to the frame piece 10 in any desired manner as, for example, by the cotter 68. At its forward end, that is, opposite to its holding edge, the holding pawl has a projection 70 which will engage the bottom surface of the lifting pawl when the holding pawl edge is in its lowest position and the holding edge of the raising pawl is likewise lowered. This projection limits the fall of the raising pawl when the spring 62 is removed.

A cam lever 71, generally of inverted T-shape, is pivoted to the frame piece 11 as by the stud 72. The vertical arm or stem 76 of this lever is slotted as at 73 so as to receive slidingly the operating rod 75 which, however, has firm engagement with the stem 76 of the cam lever when the parts are in raising position. A strong spring 77 is fastened at one end to the top of the stem of the cam lever as at 78 and its lower end is fast to the frame 11 as at 79 so that when the spring 77 is free to act, as in the lowering movement, the forwardly extending cam portion 80 of the cam lever is in engagement with a stud 81 on the raising pawl 61 and a somewhat similar stud 82 on the holding pawl 65. The strength of the spring 77 is sufficiently greater than the springs 66 and 62 as to overbalance them and free the pawls provided no load is on the saddle.

The operating rod 75 is threaded at its forward end and is received into the knob casting 83 which is slotted in awl fashion so that the position of the knob can be adjusted with respect to the rod and when in proper position the knob casting can be locked to the adjusting rod 75 by means of the lock nut 84. After passing thru a guide 85 at the forward end of the box-like portion of the lever casting of the handle, the operating rod passes thru the slot 73 in the upright portion or stem 76 of the cam lever and between the guide 85 and the cam lever stem is a heavy spring 86 abutting a collar 87 permanently secured to the rod 75 and either striking directly against the stem of the cam lever or preferably having a washer on the rod which washer in turn engages the stem of the cam lever 71 when the knob 52 is pushed rearwardly and into the slot 88 which is the raising position. When the knob is in this slot 88 the strong spring 86 lifts the active end of the cam lever 80 and extends the yielding spring 77 so as to pull the cam lever out of engagement with the lugs 81 and 82.

After passing thru the slot 73 in the cam lever (see Figure 2a) the operating rod 75 passes further rearwardly and has an operative engagement with an elevating lever 90 which is a simple structure of L-form pivoted at its angle on a stud 91 fast to the frame side member 11, its vertical arm 95 slotted to receive the operating rod and its horizontal arm 92 extending at an angle so as to project horizontally beneath the rearward arm 37 of the lifting lever. Ordinarily the rear or horizontal arm 92 of this lever rests on a lug 93 on the inner face of the frame piece 11 and the operating rod 75 passes loosely thru the slotted vertical arm 95. Because of the lock nuts 94 near the rear end of the operating rod 75, the latter can pull the vertical arm of the elevating lever forward which raises the horizontal arm 92 and if the saddle be in a lowered position such movement of the operating rod will cause the saddle to raise or be elevated. In this manner the saddle or load support 40 can very quickly be thrown into proper position without the necessity of using the step by step motion.

In the raising position at the bottom of the stroke of the handle the raising pawl is in engagement with a tooth and the weight of the load makes this engagement a firm one but even when the handle is raised slightly the operating edge of the raising pawl cannot be freed of the tooth because the boss or barrel-shaped portion of the holding pawl prevents such movement altho when the handle is raised still further the lifting pawl can idle over the tooth because its body from top to bottom is constantly thinner from its axis rearwardly and by the time the handle, and with it the pawl, has moved the distance of a single tooth, the lifting pawl has sufficient room to lower because of its thinner portion now being immediately above the axis of the holding pawl. While the lifting pawl is thus idling the third rearward tooth has been firmly engaged by the holding pawl which, however, is held in contact with the quadrant only by the load and by its spring, the cam lever in the elevating position being raised completely above both pawl lugs.

In the lowering stroke of the handle the horizontal arm of the cam is always in engagement with one or the other of the cam lugs and sometimes both. At the top of the stroke of the handle the lug 81 on the lifting pawl has come out of the recess 96 in the lower edge of the cam lever and has engaged the cam surface 97 forwardly of said recess and is thus holding the horizontal cam arm elevated to such an extent as to free the lug 82 entirely. The spring 66 of the holding pawl, therefore, causes this pawl to engage a tooth of the rack segment and this holds the load as long as the raising pawl is in this idle position. However, as the lifting pawl moves rearwardly with the lowering of the handle, the lug 81 moves into the recess 96 and this permits the operative edge of the lifting pawl to take hold of the load but just as soon as the load is carried by the lifting pawl the holding pawl is released by the action of the cam lever spring 77 which can now contract as soon as the holding pawl is free of the load. Should there be no load on the saddle the rear end of the lifting lever can drop as under such circumstances the cam lever presses the holding pawl entirely out of engagement with the rack segment, at the time when the lifting pawl is also free. This is desirable in order that the saddle may be returned to lowest position in the quickest possible manner.

The operation of the device is as follows: By means of the handle the jack is lifted off of the small front rollers 30 by engagement of the handle piece with the shoulder 98 so that the entire weight is on the rear wheels 21 and on the handle grip 50 and in such position the device is moved so that the saddle is directly beneath the load to be raised, for example, the axle of an automobile, and at such time the load carrying saddle 40 or support is usually in its lowest position, that is, on a level approximately with the top of the rear ground wheels 21. If the load is very slightly above the lowest position of the saddle the saddle is raised in step by step motion but if the load is from one to three inches above the saddle the latter may be brought into engagement with the load by a steady pull on the knob which will move the rod rearwardly and turn the positioning lever about its axis so that its inwardly extending rear edge will engage the bottom edge of the lifting lever and elevate it to proper position. Should the load be still higher a very quick forward movement of the rod 75 by the knob 52 will give a quick start to the lifting lever 90 and the lever and saddle can be caught in a highly elevated position by a quick return of the rod after the initial quick pulling forward of the rod.

After making this initial quick position movement of the saddle the rod is moved to its forward position by means of the knob 52 and the knob is turned so as to engage in the notch 88 in the handle casting which compresses the spring 86 which holds the cam lever 71 so as to hold it free of the pawls 61 and 65. An upward movement of the handle will cause the lifting pawl 61 to idle over the teeth 42 of the lifting lever 36 and on the downstroke of the handle the lifting pawl 61 will raise the saddle 40 by one notch on the quadrant and the holding pawl 65 will maintain the load carrying support in this position during the idle or upward movement of the handle. Should it be attempted to raise the load carrying support or saddle beyond its range no action will take place because in such position of the parts the edge of the pawl has passed the last tooth of the quadrant and merely idles as the handle is moved up and down. The holding pawl, however, being further back, is unaffected and maintains the load at maximum height.

To lower the load the knob 52 is withdrawn from its slot 88 in the handle casting and this releases the compression spring 86 so that the cam lever is now free to rest upon the projecting lugs 81 and 82 on the two pawls. During movement of the handle the load itself prevents the dropping of the holding pawl but if the jack is raised with no load the saddle will preferably fall its complete range upon release of the knob from the slot for in such case the holding pawl 65 will be released by the cam lever 71. Assuming a load on the saddle, the raising of the handle causes the lifting pawl to withdraw one notch and upon lowering of the handle the holding pawl withdraws one notch and then engages the next tooth, the cam lever being raised by the lug on the lifting pawl which movement temporarily frees the holding pawl so that the latter is held under the urge of its own spring and by friction.

The jack, because of its minimum clearance, its extremely short body and relatively light weight considering the capacity of the jack, is an extremely valuable piece of equipment for quick operation, for example, upon a car that draws up alongside of the garage and desires some simple operation requiring a jack, the freeing of one of the wheels, as for example, the changing of a tire. Such a jack as herein described can readily be left available at the edge of the sidewalk and near the curb, the latter giving its name to this particular type of short sturdy jack.

What we claim is:

1. A jack having a frame, a lifting lever pivoted to the frame and having an arcuate rack or quadrant, a holding pawl pivoted to the frame and spring-pressed into engagement with the teeth of the quadrant, a handle pivoted to the frame, a raising and lowering pawl spring pressed into engagement with the teeth of the lifting lever and having operative engagement with the handle to move the lifting lever about its pivot upon movement of the handle, a cam lever associated with said pawls, a spring mounted to urge the cam lever into engagement with the pawls with sufficient force to overcome the pawl springs, and means carried by the handle for holding the cam lever against the urge of its spring, said means being yieldably connected to the cam lever whereby the cam lever is held against the urge of its spring during the movement of the handle.

2. A jack having a frame, a lifting lever pivoted to the frame and having an arcuate rack, a holding pawl pivoted to the frame and spring-pressed into engagement with the teeth of the rack, a handle pivoted to the frame, a raising and lowering pawl spring pressed into engagement with the teeth of the lifting lever rack and having operative engagement with the handle to move the lifting lever about its pivot upon movement of the handle, a cam lever associated with said pawls, a spring mounted to urge the cam lever into engagement with the pawls, and yielding means for holding the cam lever against the urge of its spring, said means including a rod, a collar on said rod, a spring between the collar and the cam lever, and means to move the rod so that the spring carried by the rod will hold the cam lever elevated and out of contact with the two pawls.

3. In a curb jack, a frame approximately half as high as it is long, said frame being composed of two parallel plates each of which at its front portion is roughly an isosceles triangle and having an integral rearwardly extending beam section, the lower face of which is at a higher elevation than the base of the triangular portion, a lifting lever pivoted to the two plates of the frame and having an arcuate toothed section, drag link means pivoted to the apex of the triangular portion of the frame and above the axis of the lifting lever, a saddle or recess plate pivoted to the lifting lever and to the drag link means, a handle pivoted to the frame, supporting means including a pair of small rollers at the front edge of the frame and a pair of large rollers at the rear of the frame, a holding pawl pivoted to the frame, a cam lever pivoted to the frame and spring pressed to hold the holding pawl out of engagement with the teeth of the lifting lever, a raising and lowering pawl pivoted to the handle and spring pressed into engagement with the teeth of the lifting lever, means carried by the holding pawl to move the cam lever out of usual position to withdraw the holding pawl and yielding means movable with the handle and independent of the holding pawl for moving the cam lever against the urge of its spring to hold the cam lever out of engagement with both of the pawls.

4. In a curb jack, a frame, a lifting lever carried by said frame, a raising and lowering pawl carried by a member pivoted to said frame, a holding pawl carried by said frame, a cam lever pivoted in said frame and movable between two positions in one of which both pawls are free to engage the lifting lever and in the other position the pawls are successively moved out of engagement with the lifting lever to permit a load on the lifting lever to be lowered, a quick raising cam pivoted to the frame, a slotted extension on the quick raising cam, a slotted extension on the cam lever and a movable rod passing thru each of said slotted extensions, spaced means on said rod adapted to engage the extensions upon movement of the rod in one direction to free the cam lever and operate the quick raising cam and in the other direction to free the quick raising cam and hold the cam lever out of engagement with both of the pawls.

5. In a curb jack, a frame, a lifting lever pivoted to said frame and having a curved toothed portion, a lowering pawl spring pressed into position to engage a tooth of said lifting lever, means carried by the frame for moving the pivot of said pawl, a lug on said pawl, a cam lever pivoted to the frame and extending toward the pivot of the lowering pawl, said cam lever having a smooth lug engaging portion and also having a recess one face of which makes an obtuse angle with said surface, resilient means for pressing the surface of said cam lever against the pawl lug, a spring pressed holding pawl adapted to engage with the teeth of the lifting lever, means including the forward face of said recess for raising said cam lever to free the holding pawl to permit its spring to cause it to engage with the lifting lever to sustain the load while the lowering pawl is idling, and yielding means carried by said pivot moving means for overcoming the action of said resilient means to render said cam lever inoperative.

6. In a jack, a frame, a lifting lever pivoted in the frame, step by step mechanism for raising and lowering said lever, an operating handle fulcrumed on the frame for actuating said mechanism, means for raising said lever independent of said step by step mechanism, said means including a reciprocating rod carried by and extending along said operating handle, an upright auxiliary handle on said rod and extending above said operating handle in readily accessible position for reciprocating said rod, means on the rod for actuating the step by step mechanism to lever raising position upon movement of the rod to the forward limit of its travel and means on the rod for engaging other elements of said first mentioned means upon movement of the rod in the opposite direction.

7. In a curb jack, a frame, a lifting lever pivoted to said frame, step by step mechanism for raising and lowering said lever, said mechanism being normally spring pressed into lever lowering position, a handle pivoted in said frame for operating said mechanism and means on said handle for moving said mechanism to lever raising position, said last means including a reciprocating rod carried by said handle, an upright auxiliary handle carried by said operating handle and having a locking position and a free position, said auxiliary handle being movable about the axis of said rod into locking position at the limit of its forward movement to thereby hold said step by step mechanism in load raising position and spring means for retracting said rod when the handle is moved from locking position.

8. In a curb jack, a frame, a lifting lever pivoted in said frame, step by step mechanism for raising and lowering said lever, a handle pivoted in said frame for operating said mechanism to raise or lower the lifting lever, said mechanism including a pivoted cam normally spring pressed to lever lowering position, an upright slotted arm on said cam, a bell crank pivoted in said frame and having an arm adapted to swing into engagement with said lifting lever to flip the same to raised position independently of said step by step mechanism, an upright arm on said crank having a slot therein alined with the slot in said cam arm, a rod carried by said handle and extended through said alined slots, means on said rod for operating the crank only upon movement of the rod in one direction and additional means on the rod for operating the cam only upon movement of the rod in the opposite direction.

9. In a curb jack, a frame, a lifting lever pivoted in said frame, step-by-step mechanism for raising and lowering said lever, a handle pivoted in said frame for operating said mechanism to raise and lower the lifting lever, a bell crank freely pivoted in said frame and having an arm adapted to engage said lever during at least a portion of the first half of its upward swing, means carried by the handle for giving the bell crank a quick impulse whereby said lifting lever may be flipped beyond the range of said arm and to its maximum height, means for rendering said step-by-step mechanism inoperative to lower the lifting lever, and said handle carried means being connected to release said last recited means prior to throwing said lever to a load engaging position.

10. In a curb jack, a frame, a lifting lever pivoted in said frame and having a load engaging saddle on its free end, a step-by-step mechanism for turning the lever about its pivot to raise or lower said saddle, a cam lever pivoted in said frame normally spring pressed into engagement with said mechanism to cause a lowering of the lever upon operation of the mechanism, an upright slotted arm on said cam lever, a bell crank lever pivoted in said frame to turn thru a limited arc and having an upright slotted arm alined with that of the cam lever, the free end of the other arm of said bell crank lever adapted to engage said free end of the lifting lever when said saddle is substantially at its lowest position, a rod in said slots for operating said lever, means on said rod for engaging the slotted arm of the bell crank lever when said rod is jerked in one direction suddenly to turn the crank and thereby flip the lifting lever upward to bring the saddle to a load engaging position, and means on the rod for engaging the slotted arm of the cam lever when the rod is pushed in the opposite direction to move the cam lever against the urge of its spring to permit the step-by-step mechanism when operated to raise the load.

11. A cam lever for a lifting jack consisting of an inverted T-shaped member having a slot in its upwardly extending stem and having means at the end of one arm for pivoting the lever, the lower edge of said member providing a pawl engaging surface extending to the free end of the other arm, said lever having on the side of said other arm and opposite the stem a recess one side of which makes an obtuse angle with said surface.

12. In a curb jack, a frame, a lifting lever pivoted in said frame, step-by-step mechanism for raising and lowering said lever, a handle pivoted in said frame for operating said mechanism to raise and lower the lifting lever, a bell crank freely pivoted in said frame and having an arm adapted to engage said lever during at least a portion of the first half of its upward swing, means carried by the handle for giving the bell crank a quick impulse whereby said lifting lever may be flipped beyond the range of said arm and to its maximum height, the free end of said arm being adapted to engage the end of said lever when the lever is in its lowest position whereby the mechanical advantage is substantially at a maximum at the beginning of the flipping or throwing movement of the bell crank.

EARL F. GREEN.
FRANK A. GRAHAM.